UNITED STATES PATENT OFFICE.

WILLIAM R. SEIGLE, OF NEW YORK, N. Y., ASSIGNOR TO H. W. JOHNS-MANVILLE COMPANY, OF NEW YORK, N. Y., A CORPORATION OF NEW YORK.

METHOD OF PRODUCING BODIES OF EXTENDED DISCONTINUOUSLY-ASSOCIATED PARTICLES OF CALCIUM CARBONATE AND THE PRODUCT THEREOF.

1,228,486. Specification of Letters Patent. Patented June 5, 1917.

No Drawing. Original application filed June 1, 1915, Serial No. 31,504. Divided and this application filed June 28, 1916. Serial No. 106,522.

*To all whom it may concern:*

Be it known that I, WILLIAM R. SEIGLE, a citizen of the United States, and resident of New York, in the county of New York and State of New York, have invented new and useful Improvements in Methods of Producing Bodies of Extended Discontinuously-Associated Particles of Calcium Carbonate and the Product Thereof, of which the following is a specification.

My invention consists of a method or process, and its product. The produce which constitutes part of my invention is a body composed of extended, or discontinuously associated, particles of calcium carbonate, and the method or process which constitutes the other part of my invention is that by which particles of calcium carbonate are aggregated to form a body or mass, and are extended, or discontinuously associated so as to make the body or mass more bulky, weight for weight, than bodies or masses composed of similar particles have been made heretofore.

Some of the practical objects subserved by the invention are: the provision of heat insulating materials of high efficiency and very light weight in contrast to bulk; the reduction of waste in the manufacture of molded heat insulators; and the increase in surface covering capacity of heat insulating plastering and painting materials, with attendant improvement in their heat insulating property. Incidentally also, my invention works economies in the manufacture of typical materials of the class indicated, by rendering available as marketable products, materials which have heretofore been wholly, or partly, disposed of as waste.

My invention in its method aspect, has been found applicable to many solid materials, in that it effects a greater extension, or discontinuity of association of component particles, in bodies composed of comminuted particles of these materials than has, so far as I am informed, heretofore been produced. To what extent new or increased utilities may be served by bodies of solid material thus treated and produced, in all cases, I am not now able to forecast; but in respect to two instances (namely, calcium and magnesium carbonates) of the process and product which constitute my invention, the products are decidedly improved and made to subserve their old uses in an improved manner or to subserve new uses.

In its broader aspects and in its specific application to magnesium carbonate, my invention is described and claimed in my application filed June 1, 1915, Serial No. 31,504, of which the present application is a division.

Finely comminuted calcium carbonate may be obtained in diverse ways. It has heretofore existed as a waste product of the manufacture of magnesium carbonate heat insulators, by the well known process wherein dolomite rock, a mixture of calcium and magnesium carbonates, is the raw material, and which, briefly stated, consists in calcination of the raw material, production of a mixed hydrate by slaking the oxides produced by calcination, charging the water vehicle with $CO_2$ to dissolve the magnesium carbonate, filtering out the calcium carbonate which resists solution, and then proceeding with the magnesium carbonate to the manufacture of the variety of articles used in commerce, of which magnesium carbonate forms the body. By this method, large quantities of calcium carbonate were produced as waste, since the low market value of this by-product seldom permitted its transportation from the place of manufacture. My invention, applied to finely divided calcium carbonate, results in a product which in various forms is readily marketable.

As applied to calcium carbonate, my invention may be practised as follows:

Given a quantity of finely comminuted, or precipitated, calcium carbonate, such as has been produced incidentally to the manufacture of articles composed of magnesium carbonate, this calcium carbonate is mixed with fresh water, in quantity sufficient to form a thick "milk." Into this "milk" is mixed a quantity of asbestos fiber and sulfite fiber, in about the same proportions, relatively to the weight of calcium carbonate, as are usual in the case of asbestos fiber and magnesium carbonate, these being about 85 parts asbestos fiber to 15 parts magnesium carbonate. This mixture of fiber and carbonate is then violently stirred, preferably by blowing air into the water, and a small amount of soluble soap added. The mixture creams and foams and can, after a few minutes of such treatment, be then drawn into filter molds, when the water is filtered out under moderate pressure, say, five or six pounds per square inch.

On drying, the solid molded masses are found to be light, porous, friable; of about the same weight per cubic foot as the magnesium carbonate blocks and shapes produced by the old process above mentioned and possessing high heat insulating capacity.

Though by no means positively certain, I am inclined to believe that the presence of the residual magnesia in the calcium carbonate is responsible for the action of the soluble soap. When dry, the extended masses of loosely bonded particles of calcium carbonate and fiber may then be recomminuted forming a dry material adapted to be mixed with water and used as plaster for interior wall-surfaces or elsewhere. The extended condition of the material persists, and plastering made therefrom will cover much more surface, pound for pound, than any other lime plastering of which I have knowledge.

Should the source of comminuted or precipitated calcium carbonate be other than the magnesium-calcium carbonate mixture above mentioned, the presence of other material capable of producing an insoluble soap will bring about the same result, qualitatively speaking.

It has been observed that in the old process hereinabove described, if the magnesia mush was stirred mechanically with paddles, the cast shapes were heavier for their bulk than when air stirring was employed. So also it has been observed that when the new process herein described is carried out by mechanical stirring, the product is heavier, more compact, or "soggier" than when the air blowing is resorted to. This superiority of air stirring over mechanical stirring in the old process, was doubtless due to the attachment of minute air bubbles to the finely divided magnesia, which carried the air bubbles into the molds, retaining them enmeshed so that the air spaces made by these bubbles extended the mass, when dried.

The same virtue of air-blowing is observed in the treatment of calcium carbonate according to my invention herein described.

The capacity to form tenuous films is characteristic of soaps. This is exemplified in the familiar phenomenon of suds and soap bubbles, and by the use of some of the insoluble metallic soaps as paint ingredients for special purposes such as coating the bottoms of ships.

Wherever a suds or froth is formed, there exists a cellular film-structure, in which gases are imprisoned. By frothing the calcium carbonate suds by air blowing, innumerable air bubbles are formed which—even without the presence of a soap—tend to attach themselves to the solid particles and are entangled among the solid particles (and fibers also, if these are present, as usual). If the insoluble metallic soap is distributed through the frothing mass, the films of soap, it is believed, form persistent bubbles, which in the aggregate agglomerate upon and between the solid particles and fibers, and hold imprisoned the minute air bubbles, retaining a far larger quantity than would remain were no film forming substance present.

Probably also, when the insoluble soap is made by introducing a soluble soap into the water which contains a metallic salt in solution, a froth or suds of soluble soap film is first formed, and these films, in cellular aggregation, are rendered insoluble by the reaction which forms the insoluble soap.

Then, it is believed, the mush carries with it these enmeshed cellular bubble-masses which persist because of the character of the films themselves, and these extend the calcium carbonate and fiber, to form the specifically light products which result, as above described.

To test this hypothesis, apply higher pressure at the filter mold than has been prescribed, say forty pounds to the square inch. The calcium carbonate mass compacts and the resulting cast shape is much heavier than when formed under more moderate pressure, say about six pounds. The degree of pressure which should be applied is that which will practically suffice to expel the water from the mold, and no more. This pressure test indicates that under high pressures the cellular bubble structures are broken down, and the calcium carbonate and fibers caused to settle on each other, and supports the hypothesis that insoluble soap films in cellular aggregation are directly responsible for the final physical result.

The extension of the mass composed of finely comminuted calcium carbonate will take place even if no fibrous materials are mixed with the material. While the mixture of asbestos fiber and sulfite pulp fiber is believed to produce the best results, particularly for the formation of cast blocks or masses, the specific character of the fibrous constituent may be varied to suit different commercial or industrial purposes.

I claim:

1. The method of producing bodies composed of extended, discontinuously associated particles of calcium carbonate, which consists in distributing the particles in a liquid with an insoluble soap, then eliminating the liquid and drying the residual solid.

2. The method of producing bodies composed of extended, discontinuously associated particles of calcium carbonate, which consists in distributing the particles mingled with fibers, in a liquid with an insoluble soap, then eliminating the liquid and drying the residual solid.

3. The method of producing bodies composed of extended, discontinuously associated particles of calcium carbonate, which consists in distributing the particles mingled with asbestos fibers, in a liquid with an insoluble soap, then eliminating the liquid and drying the residual solid.

4. The method of producing bodies composed of extended, discontinuously associated particles of calcium carbonate, which consists in distributing the particles mingled with asbestos fibers and cellulose fibers, in a liquid with an insoluble soap, then eliminating the liquid and drying the residual solid.

5. The method of producing bodies composed of extended, discontinuously associated particles of calcium carbonate, which consists in distributing the particles mingled with sulfite pulp fibers, in a liquid with an insoluble soap, then eliminating the liquid and drying the residual solid.

6. The method of producing bodies composed of extended, discontinuously associated particles of calcium carbonate, which consists in distributing the particles in a liquid with an insoluble soap and agitating, then eliminating the liquid and drying the residual solid.

7. The method of producing bodies composed of extended, discontinuously associated particles of calcium carbonate, which consists in distributing the particles in a liquid with an insoluble soap and blowing air through the liquid to agitate it and its contents, then eliminating the liquid and drying the residual solid.

8. The method of producing bodies composed of extended, discontinuously associated particles of calcium carbonate, which consists in distributing the particles in water containing a metallic salt in solution, adding thereto a soluble soap, then eliminating the water and drying the residual solid.

9. The method of producing bodies composed of extended, discontinuously associated particles of calcium carbonate, which consists in distributing the particles mingled with fibers in water containing a metallic salt in solution, adding thereto a soluble soap, then eliminating the water and drying the residual solid.

10. The method of producing bodies composed of extended, discontinuously associated particles of calcium carbonate, which consists in distributing the particles mingled with asbestos fibers in water containing a metallic salt in solution, adding thereto a soluble soap, then eliminating the water and drying the residual solid.

11. The method of producing bodies composed of extended, discontinuously associated particles of calcium carbonate, which consists in distributing the particles mingled with asbestos fibers and cellulose fibers, in water containing a metallic salt in solution, adding thereto a soluble soap, then eliminating the water and drying the residual solid.

12. The method of producing bodies composed of extended, discontinuously associated particles of calcium carbonate, which consists in distributing the particles mingled with sulfite pulp fibers, in water containing a metallic salt, in solution, adding thereto a soluble soap, then eliminating the water and drying the residual solid.

13. The method of producing bodies composed of extended, discontinuously associated particles of calcium carbonate, which consists in distributing the particles in water containing a metallic salt in solution, adding thereto a soluble soap and agitating, then eliminating the water and drying the residual solid.

14. The method of producing bodies composed of extended, discontinuously associated particles of calcium carbonate, which consists in distributing the particles in water containing a metallic salt in solution, adding thereto a soluble soap, blowing air through the liquid to agitate it and its contents, then eliminating the water and drying the residual solid.

15. A body comprising discontinuously associated particles of calcium carbonate extended by an insoluble soap distributed through the mass.

16. A body of discontinuously associated particles of calcium carbonate mixed with fibers extended by an insoluble soap distributed through the mass.

17. A body of discontinuously associated particles of calcium carbonate mixed with asbestos fibers and cellulose fibers, extended by an insoluble soap distributed through the mass.

18. A body comprising discontinuously associated particles of calcium carbonate mixed with asbestos fibers extended by an insoluble soap distributed through the mass.

Signed by me at New York, N. Y., this 23rd day of June, 1916.

WILLIAM R. SEIGLE.